(12) United States Patent
Zhu et al.

(10) Patent No.: US 9,978,398 B2
(45) Date of Patent: May 22, 2018

(54) VOICE ACTIVITY DETECTION METHOD AND DEVICE

(71) Applicant: ZTE CORPORATION, Shenzhen, Guangdong Province (CN)

(72) Inventors: Changbao Zhu, Shenzhen (CN); Hao Yuan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 62 days.

(21) Appl. No.: 14/915,246

(22) PCT Filed: May 16, 2014

(86) PCT No.: PCT/CN2014/077704
§ 371 (c)(1),
(2) Date: Feb. 28, 2016

(87) PCT Pub. No.: WO2014/177084
PCT Pub. Date: Nov. 6, 2014

(65) Prior Publication Data
US 2016/0203833 A1    Jul. 14, 2016

(30) Foreign Application Priority Data
Aug. 30, 2013  (CN) .......................... 2013 1 0390795

(51) Int. Cl.
*G10L 25/78* (2013.01)
*G10L 25/84* (2013.01)
(Continued)

(52) U.S. Cl.
CPC .............. *G10L 25/84* (2013.01); *G10L 17/06* (2013.01); *G10L 25/48* (2013.01); *G10L 25/78* (2013.01); *G10L 2025/786* (2013.01)

(58) Field of Classification Search
CPC ....................................................... G10L 25/78
See application file for complete search history.

(56) References Cited

U.S. PATENT DOCUMENTS

2011/0035213 A1\* 2/2011 Malenovsky ........... G10L 25/78
704/208
2011/0184734 A1\* 7/2011 Wang ...................... G10L 25/78
704/233

(Continued)

FOREIGN PATENT DOCUMENTS

CN         1473321 A     2/2004
CN         102044242 A   5/2011
(Continued)

OTHER PUBLICATIONS

Vladimír Malenovský, Milan Jelínek, "Improving the Detection Efficiency of the VMR-WB VAD Algorithm on Music Signals", 16th European Signal Processing Conference (EUSIPCO 2008), Lausanne, Switzerland, Aug. 25-29, 2008.\*

(Continued)

*Primary Examiner* — Jialong He
(74) *Attorney, Agent, or Firm* — Ling Wu; Stephen Yang; Ling and Yang Intellectual Property (57) ABSTRACT

Disclosed are a voice activity detection method and device, wherein the method includes: obtaining a combined VAD judgment result according to the number of continuous active frames, an average total SNR of all sub-bands, a tonal signal flag, and at least two existing VAD judgment results (107). The method and device are suitable for voice service, solve the problem of inaccurate VAD detection and realize highly accurate VAD judgment.

11 Claims, 3 Drawing Sheets

(51) Int. Cl.
*G10L 17/06* (2013.01)
*G10L 25/48* (2013.01)

(56) References Cited

U.S. PATENT DOCUMENTS

| | | | | |
|---|---|---|---|---|
| 2011/0264447 A1* | 10/2011 | Visser | ................. | G10L 25/78 704/208 |
| 2012/0065966 A1* | 3/2012 | Wang | ................. | G10L 25/78 704/210 |
| 2012/0232896 A1* | 9/2012 | Taleb | ................. | G10L 25/78 704/233 |
| 2013/0191117 A1* | 7/2013 | Atti | ................. | G10L 25/84 704/226 |
| 2013/0282367 A1* | 10/2013 | Wang | ................. | G10L 25/78 704/210 |

FOREIGN PATENT DOCUMENTS

| | | |
|---|---|---|
| CN | 102687196 A | 9/2012 |
| CN | 102741918 A | 10/2012 |
| CN | 103117067 A | 5/2013 |
| CN | 103180900 A | 6/2013 |
| JP | 2001516463 A | 9/2001 |
| JP | 2004020679 A | 1/2004 |
| JP | 2007156493 A | 6/2007 |
| JP | 2013050604 A | 3/2013 |
| JP | 2013508744 A | 3/2013 |
| JP | 2013520707 A | 6/2013 |
| WO | 2012083552 A1 | 6/2012 |
| WO | 2013106192 A1 | 7/2013 |

OTHER PUBLICATIONS

Digital cellular telecommunications system(Phase 2+); Voice Activity Detector (VAD) for Adaptive Multi-Rate(AMR) speech traffic channels; General description(GSM 06.94 version 7.1.0 Release 1998); Draft ETSI EM 301 708 V7.1.0 (Jul. 1999); XP014003772.

* cited by examiner

VOICE ACTIVITY DETECTION METHOD AND DEVICE

TECHNICAL FIELD

The present document relates to the field of communications, and more particularly, to a voice activity detection method and device.

BACKGROUND OF THE INVENTION

In normal voice calls, users sometimes talk, sometimes listen, at this time there will be voice inactive phases during a call process, and under normal circumstances, the total voice inactive phases of both parties in a call is more than 50% of the total voice coding time period. In the voice inactive phases, there is only background noise, and the background noise usually does not have useful information. Using this fact, in the audio signal processing procedure, the voice activity detection (VAD) algorithm is used to detect active voice and inactive voice, and different methods are used to process. Many modern voice coding standards such as AMR and AMR-WB support the VAD function. In terms of efficiency, the VAD of these encoders cannot achieve good performance in all typical background noises. Especially in the non-stationary noise, the VAD efficiencies of these encoders are relatively low. As for the music signals, these VADs sometimes have detection errors, resulting in noticeable decline in the qualities of corresponding processing algorithms. In addition, related VAD technologies have the problem of inaccurate judgment, for example, the detection of few frames before the voice section is not accurate in some VAD technologies, while in some VADs, the detection of a few frames after the voice section is not accurate.

SUMMARY OF THE INVENTION

The embodiment of the present document provides a voice activity detection method and device for addressing the problem that the related VAD detection is not accurate.

A voice activity detection method comprises:

obtaining a combined VAD judgment result according to the number of continuous active frames, an average total SNR of all sub-bands, a tonal signal flag and at least two existing VAD judgment results.

Preferably, the method further comprises:

obtaining a sub-band signal and a spectrum amplitude of a current frame;

calculating values of a frame energy parameter, spectral centroid features, and time-domain stability features of the current frame according to the sub-band signal;

calculating values of spectral flatness features and tonality features according to the spectrum amplitude;

calculating the tonal signal flag according to the tonality features, the spectral centroid features, the time-domain stability features and the spectral flatness features.

Preferably, the method further comprises:

obtaining background noise energy estimated from a previous frame;

calculating the average total SNR of all sub-bands according to the background noise energy estimated from the previous frame and the frame energy parameter of the current frame.

Preferably, said obtaining the background noise energy estimated from the previous frame comprises:

obtaining a sub-band signal and a spectrum amplitude of the previous frame;

calculating values of a frame energy parameter, spectral centroid features, and time-domain stability features of the previous frame according to the sub-band signal of the previous frame;

calculating spectral flatness features and tonality features of the previous frame according to the spectrum amplitude of the previous frame;

calculating a background noise flag of the previous frame according to the frame energy parameter, the spectral centroid features, the time-domain stability features, the spectral flatness features and the tonality features of the previous frame;

calculating a tonal signal flag of the previous frame according to the tonality features, the spectral centroid features, the time-domain stability features, and the spectral flatness features of the previous frame;

obtaining the energy of background noise over all sub-bands of the previous frame according to the background noise flag, the frame energy parameter and the tonal signal flag of the previous frame, and the energy of background noise over all sub-bands of a previous second frame.

Preferably, the frame energy parameter is a weighted or non-weighted sum of sub-band signal energies;

the spectral centroid features are a ratio of the weighted sum to the non-weighted sum of signal energies of all sub-bands or partial sub-bands, or a value is obtained by applying a smooth filter to the ratio;

the time-domain stability features are the ratio of variance of a plurality of sums of energy amplitudes of two adjacent frames to the expectation of square of a plurality of sums of energy amplitudes of two adjacent frames, or the ratio multiplied by a factor;

the spectral flatness features are the ratio of the geometric mean to the arithmetic mean of certain spectrum amplitude, or the ratio multiplied by a factor;

the tonality features are obtained by calculating a correlation coefficient of intra-frame spectral difference coefficient of two adjacent frame signals, or obtained by continuously smoothing filtering the correlation coefficient.

Preferably, calculating the tonal signal flag according to the tonality features, the spectral centroid features, the time-domain stability features, and the spectral flatness features comprises:

A) when the current frame signal is a non-tonal signal, using a tonal frame flag tonality_frame to indicate whether the current frame is a tonal frame or not;

B) executing step C) when one of the following conditions is met, and executing step D) when neither of the following two conditions is met:

condition 1: the value of the tonality features tonality_rate1 or its smoothing filtered value is greater than a corresponding first tonality feature decision threshold which is set;

condition 2: the value of the tonality features tonality_rate1 or its smoothing filtered value is greater than a corresponding second tonality feature threshold which is set;

C) judging whether the current frame is a tonal frame or not, and setting the value of the tonal frame flag according to the judgment result:

determining that the current frame is a tonal frame when all of the following conditions are met, and determining that the current frame is non-tonal frame and executing step D) when any one or more of the following conditions are not met:

condition 1: the value of the time-domain stability feature is less than a first time-domain stability decision threshold which is set;

condition 2: the value of the spectral centroid feature is greater than a first spectral centroid decision threshold which is set;

condition 3: when the spectral flatness feature of each sub-band is less than its corresponding preset spectral flatness decision threshold; determining that the current frame is a tonal frame, and setting the value of the tonal frame flag;

D) updating the tonality degree feature tonality_degree according to the tonal frame flag, wherein the initial value of the tonality degree feature tonality_degree is set when the voice activity detection starts to work;

E) judging whether the current frame is a tonal signal or not according to the updated tonality degree feature tonality_degree, and setting the value of the tonal signal flag tonality_flag.

Preferably, when the current tonal frame flag indicates that the current frame is a tonal frame, the following expression is used to update the tonality degree feature tonality_degree:

$$tonality\_degree = tonality\_degree_{-1} \cdot td\_scale\_A + td\_scale\_B,$$

wherein, $tonality\_degree_{-1}$ is the tonality degree feature of the previous frame, its initial value is in the value range of [0,1], td_scale_A is an attenuation coefficient, and td_scale_B is an accumulation coefficient.

Preferably, when the tonality degree feature tonality_degree is greater than the set tonality degree threshold, the current frame is judged to be a tonal signal;

when the tonality degree feature tonality_degree is less than or equal to the set tonality degree threshold, that the current frame is judged to be a non-tonal signal.

Preferably, the method further comprises:

when the current frame is the second frame and the subsequent frames, calculating the current number of continuous active frames continuous_speech_num2 through the previous combined VAD judgment result:

when the combined VAD flag vad_flag is 1, the continuous_speech_num2 is added by 1;

when the vad_flag is judged to be 0, the continuous_speech_num2 is set to 0.

Preferably, when the current frame is the first frame, the number of continuous active frames is 0.

Preferably, when the existing VAD judgment result or the combined VAD judgment result is 1, it indicates that it is an active voice frame, when the existing VAD judgment result or the combined VAD judgment result is 0, it indicates that it is an inactive voice frame, and obtaining a combined VAD judgment result based on the number of continuous active frames, the average total SNR of all sub-bands, the tonal signal flag and the at least two existing VAD judgment results comprises:

selecting a logical operation of at least two existing VAD judgment results as a combined VAD judgment result when any one of the following conditions is met, selecting one of at least two existing VAD judgment results as the combined VAD judgment result when at least one of the following conditions is not met, wherein the logical operation refers to the "or" operation or the "and" operation:

condition 1: the average total SNR of all sub-bands is greater than the signal-to-noise ratio threshold, condition 2: the continuous_speech_num2 is greater than the threshold of the number of continuous active frames and the average total SNR of all sub-bands is greater than the signal-to-noise ratio threshold, condition 3: the tonal signal flag is set to 1.

Preferably, when the existing VAD judgment result or the combined VAD judgment result is 1, it indicates that it is an active voice frame, and when the existing VAD judgment result or the combined VAD judgment result is 0, it indicates that it is an inactive voice frame, said obtaining a combined VAD judgment result according to the number of continuous active frames, the average total SNR of all sub-bands, the tonal signal flag and the at least two existing VAD judgment results comprises:

the combined VAD judgment result being 1 when any one of the following conditions is met, and selecting a logical operation of the at least two existing VAD judgment results as an output when at lease one of the following conditions is not met, wherein the logical operation refers to the "or" operation or the "and" operation:

condition 1: the at least two existing VAD judgment results are all 1 condition 2: the sum of the at least two existing VAD judgment results is greater than the combined decision threshold, and the tonal signal flag is set to 1, condition 3: when the continuous_speech_num2 is greater than the threshold of the number of continuous active frames and the average total SNR of all sub-bands is greater than the signal-to-noise ratio threshold, and the tonal signal flag is set to 1.

The embodiment of the present document further provides a voice activity detection device, comprising:

a combined judgment module, configured to obtain a combined VAD judgment result according to the number of continuous active frames, an average total SNR of all sub-bands, a tonal signal flag and at least two existing VAD judgment results.

Preferably, the device further comprises a parameter obtaining module, and the parameter obtaining module comprises:

a first parameter obtaining unit, configured to obtain a sub-band signal and a spectrum amplitude of a current frame;

a second parameter obtaining unit, configured to calculate values of a frame energy parameter, spectral centroid features, and time-domain stability features of the current frame according to the sub-band signal;

a third parameter obtaining unit, configured to calculate spectral flatness features and tonality features according to the spectrum amplitude;

a fourth parameter obtaining unit, configured to calculate the tonal signal flag according to the tonality features, the spectral centroid features, the time-domain stability features and the spectral flatness features.

Preferably, the parameter obtaining module further comprises:

a fifth parameter obtaining unit, configured to obtain background noise energy estimated from the previous frame;

a sixth parameter obtaining unit, configured to calculate the average total SNR of all sub-bands according to the background noise energy estimated from the previous frame and the frame energy parameter of the current frame.

Preferably, the parameter obtaining module further comprises:

a seventh parameter obtaining unit, configured to determine that the number of continuous active frames is 0 when the current frame is the first frame, calculate the current number of continuous active frames continuous_speech_num2 through the previous combined VAD judgment result when the current frame is the second frame as well as the voice frame after the second frame:

when the combined VAD flag vad_flag is 1, the continuous_speech_num2 is added by 1;

when the vad_flag is judged to be 0, the continuous_speech_num2 is set to 0.

The embodiment of the provides a voice activity detection method and device to obtain a combined VAD judgment result according to the number of continuous active frames, the average total SNR of all sub-bands, the tonal signal flag and the at least two VAD judgment results, to achieve a VAD judgment comprehensively according to various parameters, improve the accuracy of the VAD decision, and solve the problem of inaccurate VAD detection.

PREFERRED EMBODIMENTS OF THE INVENTION

In order to solve the problem of inaccurate VAD detection, the embodiment of the present document provides a voice activity detection method. Hereinafter, in conjunction with the accompanying drawings, the embodiments of the present document will be described in detail. In the case of no conflict, embodiments and features in the embodiments of the present application may be combined arbitrarily with each other.

In the following, in conjunction with the accompanying drawings, the first embodiment of the present document will be described.

Figure 1:
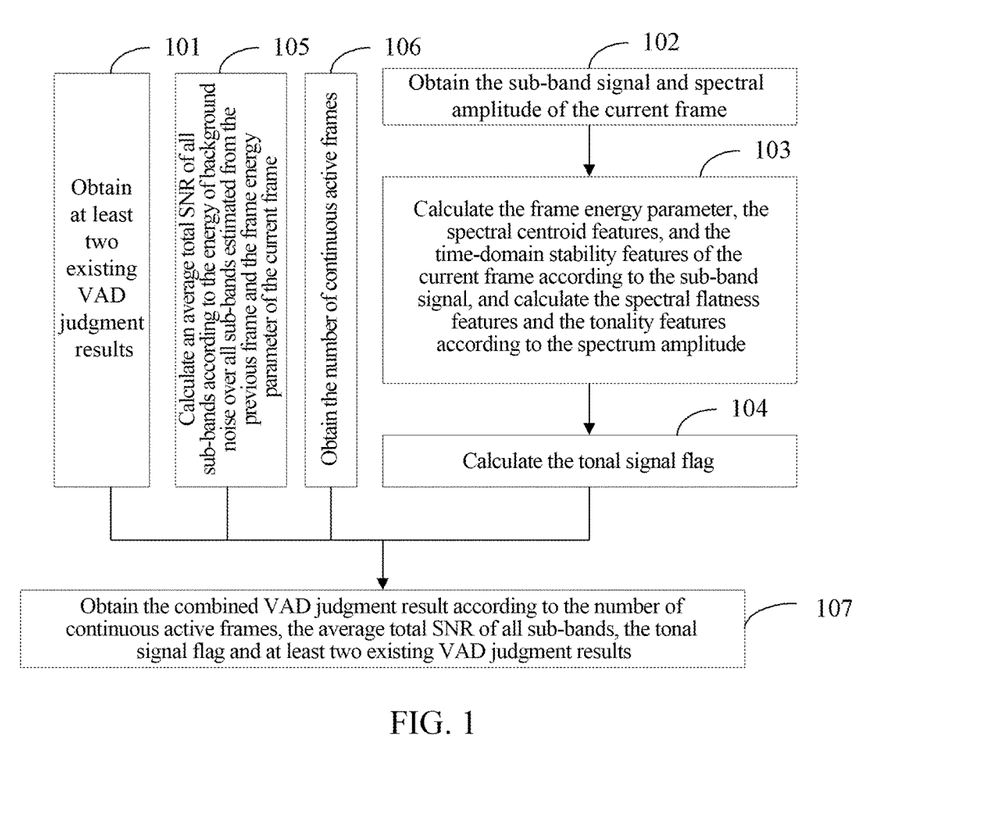
FIG. 1 is a flow chart of a voice activity detection method provided in a first embodiment of the present document.

The embodiment of the present document provides a voice activity detection method, and uses this method to complete the VAD process, as shown in FIG. 1, comprising:

in step 101: it is to obtain at least two existing VAD judgment results;

in step 102: it is to obtain the sub-band signal and spectrum amplitude of the current frame.

The embodiment of the present document takes an audio stream whose frame length is 20 ms and sampling rate is 32 kHz as an example to describe. Under the circumstances of other frame lengths and sampling rates, the voice activity detection method provided in the embodiment of the present document is also applicable.

It is to input the time-domain signal of the current frame into a filter bank unit, and perform sub-band filtering calculation to obtain the sub-band signal of the filter bank.

The embodiment of the present document uses a 40-channel filter bank, the technical solution provided in the embodiment of the present document is equally applicable to filter banks with different numbers of channels.

It is to input the time-domain signal of the current frame into the 40-channel filter bank, and perform the sub-band filtering calculation to obtain the filter bank sub-band signals X[k,l] of the 40 sub-bands at 16 time samples, 0≤k<40, 0≤l<16, wherein, k is the index of the filter bank sub-band and its value represents the sub-band corresponding to the coefficient, and l is the time sample index of each sub-band, its implementation steps are as follows:

1: it is to store the most recent 640 audio signal samples into a data cache.

2: it is to shift the data in the data cache by 40 positions, and shifts the first 40 samples out of the data cache, and store 40 new samples to the $0^{th}$-$39^{th}$ positions.

It is to multiply data x in the cache by a window coefficient to obtain an array z, and the calculation expression as follows:

$z[n]=x[n] \cdot W_{qmf}[n]$; 0≤n<640;

wherein $W_{qmf}$ is the filter bank window coefficient.

a 80-point data u is calculated by using the following pseudo codes,

```
for (n = 0; n <80; n ++)
{   u[n] = 0;
    for (j = 0; j <8; j ++)
    {
    u[n]+ = z[n+j•80];
    }
}
``` the following equations are used to calculate arrays r and i:

$r[n]=u[n]-u[79-n]$ $i[n]=u[n]+u[79-n]$, 0≤n<40 the following equation is used to calculated 40 complex sub-band samples at the first time sample, X[k,l]=R(k)+iI(k), 0≤k<40, wherein R(k) and I(k) are respectively the real and imaginary parts of the coefficient of the filter bank sub-band signal X at the l-th time sample, and its calculation expression is as follows:

$$R(k) = \sum_{n=0}^{39} r(n)\cos\left[\frac{\pi}{40}\left(k+\frac{1}{2}\right)n\right]$$
$$I(k) = \sum_{n=0}^{39} i(n)\cos\left[\frac{\pi}{40}\left(k+\frac{1}{2}\right)n\right], 0 \leq k < 40.$$

3: it is to repeat the computation process of step 2 until all the data of the present frame are filtered through the filter bank, and the final output result is the filter bank sub-band signal X[k,l].

4: after completing the above calculation process, it is to obtain a filter bank sub-band signal X[k,l] at 16 time samples of 40 sub-bands, wherein, 0≤k<40, 0≤l<16.

Then, it is to perform a time-frequency transform on the filter bank sub-band signal and calculate the spectrum amplitude.

Wherein the embodiment of the present document can be achieved by performing the time-frequency transformation on all or part of the filter bank sub-bands and calculating the spectrum amplitude. The time-frequency transformation method in the embodiment of the present document may be DFT, FFT, DCT, or DST. The embodiment of the present document uses the DFT as an example to illustrate its implementation method. The calculation process is as follows:

performing a 16-point DFT transformation on data at 16 time sample points of respective filter bank sub-bands whose indexes are 0-9, improving the spectral resolution, calculating the amplitude of each frequency point, and obtaining the spectrum amplitude $X_{DFT\_AMP}$.

The time-frequency transformation calculation expression is as follows:

$$X_{DFT}[k, j] = \sum_{l=0}^{15} X[k, l] \cdot e^{-\frac{2\pi i}{16} jl}; 0 \leq k < 9; 0 \leq j < 16;$$

The process of calculating the amplitude of each frequency point is as follows:

first, calculating the energy of the array $X_{DFT}[k,j]$ at various points, and the calculation expression is as follows:
$X_{DFT\_POW}[k,j] = (real(X_{DFT}[k,j]))^2 + (image(X_{DFT}[k,j]))^2$;
$0 \leq k < 10$; $0 \leq j < 16$; wherein $real(X_{DFT\_POW}[k,j])$ and $image(X_{DFT\_POW}[k,j])$ respectively represent the real and imaginary parts of the spectral coefficient $X_{DFT\_POW}[k,j]$.

If k is an even number, then the following equation will be used to calculate the spectrum amplitude at various frequency points:

$X_{DFT\_AMP}[8 \cdot k+j] = \sqrt{X_{DFT\_POW}[k,j] + X_{DFT\_POW}[k,15-j]}$; $0 \leq k < 10$; $0 \leq j < 8$;

If k is an odd number, the following equation will be used to calculate the spectrum amplitude at each frequency point:

$X_{DFT\_AMP}[8 \cdot k + 7 - j] = \sqrt{X_{DFT\_POW}[k,j] + X_{DFT\_POW}[k,15-j]}$; $0 \leq k < 10$; $0 \leq j < 8$;

$X_{DFT\_AMP}$ is the time-frequency transformed spectrum amplitude.

in step 103: it is to calculate the frame energy parameter, the spectral centroid features and the time-domain stability features of the current frame according to the sub-band signal, and calculate the spectral flatness features and the tonality features according to the spectrum amplitude;

the frame energy parameter may be obtained in the prior art, and preferably, each of the parameters is obtained through the following method:

the frame energy parameter is a weighted or non-weighted sum of sub-band signal energies:

1, it is to calculate the energy of each filter bank sub-band according to the filter bank sub-band signal X[k,l], and the calculation expression is as follows:

$$E_{sb}[k] = \sum_{l=0}^{15} ((real(X[k, l]))^2 + (image(X[k, l]))^2); 0 \leq k < 40;$$

2, it is to accumulate the energies of parts of the filter bank sub-bands with sensitive hearing or all of the filter bank sub-bands to obtain the frame energy parameter.

Wherein, according to the psychoacoustic model, the human ear will be relatively insensitive to sound at extremely low frequency (such as 100 Hz or less) and high frequency (such as 20 kHz or above), the embodiment of the present document considers that for the filter bank sub-bands that are ordered from low to high frequency, the second sub-band to the last second sub-band are major filter bank sub-bands with relatively sensitive hearing, the energies of part or all of the filter bank sub-bands with relatively sensitive hearing are accumulated to obtain the frame energy parameter 1, and the calculation expression is as follows:

$$E_{t1} = \sum_{n=e\_sb\_start}^{e\_sb\_end} E_{sb}[n];$$

wherein, e_sb_start is the starting sub-band index whose value range is [0,6]. e_sb_end is the ending sub-band index whose value is greater than 6 and less than the total number of sub-bands.

The frame energy parameter 2 can be obtained by adding the frame energy parameter 1 and the weighted values of part or all of the energies of the filter bank sub-band unused when calculating the frame energy parameter 1, and its calculation expression is as follows:

$$E_{t2} = E_{t1} + e\_scale1 \cdot \sum_{n=0}^{e\_sb\_start-1} E_{sb}[n] + e\_scale2 \cdot \sum_{n=e\_sb\_end+1}^{num\_band} E_{sb}[n];$$

wherein, e_scale1 and e_scale2 are weighted scale factors whose value ranges are respectively [0,1]. num_band is the total number of sub-band.

The spectral centroid features are the ratio of the weighted sum to the non-weighted sum of signal energies of all sub-bands or partial sub-bands, or a value is obtained by applying a smooth filter to the ratio;

it is to calculate the spectral centroid features according to the energies of various filter bank sub-bands, the spectral centroid features are obtained by calculating the ratio of the weighted sum of the filter bank sub-band energies to the sum of the sub-band energies, or by smoothing filtering other spectral centroid features.

The spectral centroid features can be obtained with the following substeps:

1. it is to divide the subband range used for the spectral centroid features calculation, as shown in Table 1.

TABLE 1

| Spectral centroid serial number | Spectral centroid starting sub-band index spc_start_band | Spectral centroid ending sub-band index spc_end_band |
| --- | --- | --- |
| 0 | 0 | 10 |
| 1 | 1 | 24 |

2, it is to calculate two spectral centroid features, respectively referring as the first range spectral centroid features and the second range spectral centroid features, by using the range division method shown in Table 1 and the following expression.

$$sp\_center[k] = \frac{\sum_{n=0}^{spc\_end\_band(k)-spc\_start\_band(k)} (n+1) \cdot E_{sb}[n + spc\_start\_band(k)] + Delta1}{\sum_{n=0}^{spc\_end\_band(k)-spc\_start\_band(k)} E_{sb}[n + spc\_start\_band(k)] + Delta2};$$

$$0 \leq k < 2$$

Delta1 and Delta2 are respectively small offset values in the range (0,1). Wherein k is the spectral centroid serial number index.

3, it is to perform a smoothing filtering operation on the first range spectral centroid features to obtain the smoothing spectral centroid features, namely the smoothing filtered value of the first range spectral centroid features, and the calculation process is as follows:

$$sp\_center[2]=sp\_center_{-1}[2] \cdot spc\_sm\_scale+sp\_center[0] \cdot (1-spc\_sm\_scale)$$

wherein, spc_sm_scale is the spectral centroid features smoothing scale factor, and $sp\_center_{-1}[2]$ is the smoothing spectral centroid features of the previous frame, and its initial value is 1.6.

The time-domain stability features are the ratio of variance of a plurality of sums of energy amplitudes of two adjacent frames to the expectation of square of a plurality of sums of energy amplitudes of two adjacent frames, or the ratio multiplied by a factor;

it is to calculate the time-domain stability features through the frame energy parameters of latest several frame signals. In the embodiment of the present document, it is to use the frame energy parameters of the latest 40 frame signals to calculate the time-domain stability features. The calculation steps are:

first, it is to calculate the energy amplitudes of the latest 40 frame signals, and the calculation equation is as follows:

$$Amp_{t1}[n]=\sqrt{E_{t2}(n)}+e\_offset; \quad 0 \le n < 40;$$

wherein e_offset is an offset value whose value range is [0, 0.1].

Second, it is to add the energy amplitudes of two adjacent frames from the current frame to the 40$^{th}$ previous frame in turn to obtain 20 amplitude superimposed values. The calculation equation is as follows:

$$Amp_{t2}(n)=Amp_{t1}(-2n)+Amp_{t1}(-2n-1); \quad 0 \le n < 20;$$

wherein, when n=0, $Amp_{t1}$ represents the energy amplitude of the current frame, when n<0, $Amp_{t1}$ represents the energy amplitude of the n$^{th}$ frame before the current frame.

Finally, it is to obtain the time-domain stability features ltd_stable_rate0 by calculating the ratio of the variance to the average energy of the latest 20 amplitude superimposed values. The calculation expression is as follows:

$$ltd\_stable\_rate0 = \frac{\sum_{n=0}^{19}\left(Amp_{t2}(n)-\frac{1}{20}\sum_{j=0}^{19}Amp_{t2}(j)\right)^2}{\sum_{n=0}^{19}Amp_{t2}(n)^2+Delta};$$

the spectral flatness features are the ratio of the geometric mean to the arithmetic mean of certain some spectrum amplitudes, or the ratio multiplied by a coefficient;

it is to divide the spectrum amplitude $X_{DFT\_AMP}$ into a plurality of frequency bands, and calculate the spectral flatness of various frequency bands of the current frame to obtain the spectral flatness features of the current frame.

The embodiment of the present document divides the spectrum amplitude into three frequency bands, and calculates the spectral flatness features of these three frequency bands, whose implementation steps are as follows:

first, dividing $X_{DFT\_AMP}$ into three frequency bands according to the index in table 2.

TABLE 2

| Frequency band serial number Freq_band | Spectral flatness starting sub-band index freq_band_start | Spectral flatness ending sub-band index freq_band_end |
|---|---|---|
| 0 | 5 | 19 |
| 1 | 20 | 39 |
| 2 | 40 | 64 | second, calculating the spectral flatness of various sub-bands to obtain the spectral flatness features of the current frame. The calculation expression of various spectral flatness features of the current frame is as follows:

$$SMR(k) = \frac{\left(\prod_{n \in Freq\_band(k)} X_{DFT\_AMP}(n)\right)^{1/(freq\_band\_end(k)-freq\_band\_start(k)+1)}}{\frac{1}{freq\_band\_end(k)-freq\_band\_start(k)+1}\sum_{n \in Freq\_band(k)} X_{DFT\_AMP}(n)};$$

$$0 \le k < 3$$

last, it is to smoothing filter the spectral flatness features of the current frame to obtain the spectral flatness features of the current frame.

$$sSMR(k)=smr\_scale \cdot sSMR_{-1}(k)+(1-smr\_scale) \cdot SMR(k); \quad 0 \le k < 3$$

wherein smr_scale is the smoothing factor whose value range is [0.6, 1], $sSMR_{-1}(k)$ is the k-th spectral flatness features of the previous frame.

It is to obtain the tonality features by calculating the correlation value of intra-frame spectral difference coefficients of two adjacent signals, or by smoothing filtering the correlation value.

The method for calculating the correlation value of intra-frame spectral difference coefficients of two adjacent signals is as follows:

calculating the tonality features according to the spectrum amplitude, wherein the tonality features can be calculated according to all or part of the spectrum amplitudes.

The calculation steps are as follows:

1, it is to perform a differential operation on part (not fewer than eight spectral coefficients) or all spectrum amplitudes with the adjacent spectrum amplitude, and set the differential result whose value is less than 0 to 0, so as to obtain a group of non-negative spectral difference coefficients.

The embodiment of the present document selects the frequency point coefficients whose position indexes are 3-61 for example to calculate the tonality features. The process is as follows:

it is to perform a differential operation on adjacent spectrum amplitudes whose frequency points are from 3 to 61, and the expression is as follows:

$$spec\_dif[n-3]=X_{DFT\_AMP}(n+1)-X_{DFT\_AMP}(n); \quad 3 \le n < 62;$$

and set variables less than 0 in spec_dif to 0.

2, it is to obtain the correlation coefficient of the non-negative spectral differential coefficient of the current frame and the non-negative spectral difference coefficient of the previous frame, calculated in step 1, to obtain the value of the first tonality features. The calculation expression is as follows:

$$\text{tonality\_rate1} = \frac{\sum_{n=0}^{56} \text{spec\_dif}[n] \cdot \text{pre\_spec\_dif}[n]}{\sqrt{\sum_{n=0}^{56} \text{spec\_dif}[n]^2 \cdot \sum_{n=0}^{56} \text{pre\_spec\_dif}[n]^2}}$$

wherein, pre_spec_dif is the non-negative spectral differential coefficient of the previous frame.

3, it is to perform a smoothing operation on the first tonality feature to obtain a second tonality feature. The calculation equation is as follows:

tonality_rate2=tonal_scale·tonality_rate2$_{-1}$+(1−tonal_scale)·tonality_rate1 tonal_scale is the tonality features smoothing factor whose value range is [0.1, 1], tonality_rate2$_{-1}$ is the second tonality feature of the previous frame whose initial value range is [0,1].

In step 104: it is to calculate the tonal signal flag, refer to the tonal signal calculation process in the third embodiment of the present document.

In step 105: it is to calculate an average total SNR of all sub-bands according to the energy of background noise over all sub-bands estimated from the previous frame and the frame energy parameter of the current frame;

the method for obtaining the full band background noise energy of the previous frame can refer to the second embodiment.

It is to calculate the full-band signal-to-noise ratio SNR2 according to the estimated energy of background noise over all sub-bands (see the second embodiment) of the previous frame and the frame energy parameter of the current frame:

$$SNR2 = \log_2 \frac{E_{t1}}{E_{t\_bg}}$$

wherein, $E_{t\_bg}$ is the estimated energy of background noise over all sub-bands of the previous frame, and the principle of obtaining the energy of background noise over all sub-bands of the previous frame is the same as the principle of obtaining the energy of background noise over all sub-bands of the current frame.

It is to calculate the mean value of the full-band signal-to-noise ratio SNR2 of a number of frames to obtain an average total SNR of all sub-bands SNR2_lt_ave.

In step 106: it is to obtain the number of continuous active frames;

the number of continuous active frames continuous_speech_num2 can be calculated according to the VAD judgment result, and the initial value is set to 0, and when the VAD flag vad_flag is 1, the continuous_speech_num2 is added by 1; and when the vad_flag is judged to be 0, the continuous_speech_num2 is set to 0.

In step 107: it is to obtain the combined VAD judgment result according to the number of continuous active frames, the average total SNR of all sub-bands, the tonal signal flag, and the at least two existing VAD judgment results;

in this step, when the existing VAD judgment result or the combined VAD judgment result is 1, it is indicated to be an active voice frame, and when the existing VAD judgment result or the combined VAD judgment result is 0, it is indicated to be an inactive voice frame. It should be noted that, using the values of 1, 0 to represent the active voice frame and the inactive voice frame only is a flag method, and all other methods of using other values or other methods to distinguish different results of the VAD judgment are within the protection scope of the embodiments of the present document.

In the following, two implementation methods will be used as examples to describe, and the implementation process can be any other combined methods.

When any one of the following conditions is met, it is to select the logical operation of at least two existing VAD judgment results as a combined VAD judgment result, when at least one of the following conditions is not met, it is to select one of the at least two existing VAD judgment results as the combined VAD judgment result, wherein the logical operation refers to the "or" operation or "and" operation:

condition 1: the average total SNR of all sub-bands is greater than the signal-to-noise ratio threshold, condition 2: the continuous_speech_num2 is greater than the threshold of the number of continuous active frames and the average total SNR of all sub-bands is greater than the signal-to-noise ratio threshold, condition 3: the tonal signal flag is set to 1.

When the existing VAD judgment result or the combined VAD judgment result is 1, it is indicated to be an active voice frame, and when the existing VAD judgment result or the combined VAD judgment result is 0, it is indicated to be an inactive voice frame. Said obtaining the combined VAD judgment result according to the number of continuous active frames, the average total SNR of all sub-bands, the tonal signal flag, and the at least two existing VAD judgment results comprises:

the combined VAD judgment result is 1 when any one of the following conditions is met, and selecting the logical operation of the at least two existing VAD judgment results as an output when at least one of the following conditions is not met, wherein, the logical operation refers to the "or" operation or the "and" operation:

condition 1: the at least two existing VAD judgment results are all 1, condition 2: the sum of the at least two existing VAD judgment results is greater than the combined decision threshold, and the tonal signal flag is set to 1, condition 3: the continuous_speech_num2 is greater than the threshold of the number of continuous active frames and the average total SNR of all sub-bands is greater than the signal-to-noise ratio threshold, and the tonal signal flag is set to 1.

There is no strict timing relationship from step 101 to step 106 in the embodiment of the present document (wherein the timing order of the steps 102, 103 and 104 cannot be reversed), and all timing relationships belong to the protection scope of the embodiments of the present document as long as the number of continuous active frames, the average total SNR of all sub-bands, the tonal signal flag, and the at least two existing VAD judgment results needed to perform the combined VAD judgment in the embodiments of the present document can be obtained.

In the following, in conjunction with the accompanying drawings, the second embodiment of the present document will be described.

Figure 2:
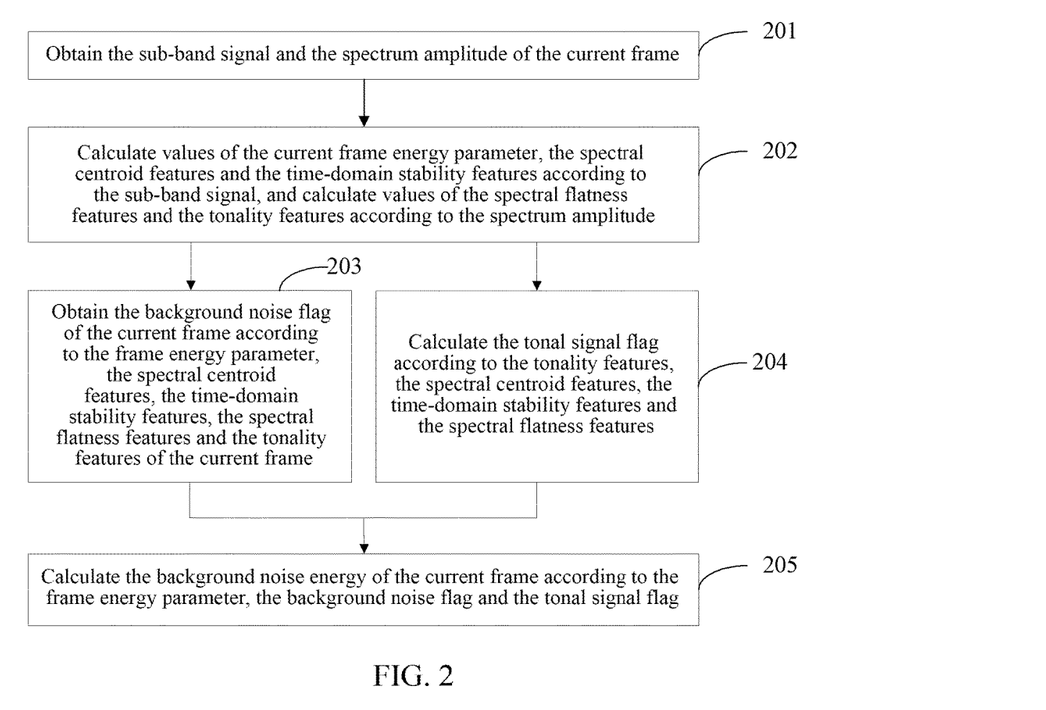
FIG. 2 is a flow chart of a voice activity detection method provided in a second embodiment of the present document.

As shown in FIG. 2, it provides a method for calculating the background noise energy of the previous frame, and the background noise energy of the previous frame is used to calculate the average total SNR of all sub-bands. The process of calculating the background noise energy of the previous frame is the same as the process of calculating the background noise energy of the current frame, and the embodiment of the present document provides the method for calculating the energy of background noise over all sub-bands of the current frame.

In step 201: it is to obtain the sub-band signal and the spectrum amplitude of the current frame, and see step 102 for the calculation method.

In step 202: it is to calculate values of the current frame energy parameter, the spectral centroid features, the time-domain stability features according to the sub-band signal; it is to calculate the spectral flatness features and the tonality features according to the spectrum amplitude, and see step 103 for the calculation method.

In step 203: it is to obtain the background noise flag of the current frame according to the frame energy parameter, the spectral centroid features, the time-domain stability features, the spectral flatness features, and the tonality features of the current frame. The background noise flag is used to indicate whether the current frame is a noise signal or not, if it is a noise signal, the background noise flag is set to 1, otherwise it is set to 0.

Preferably, assuming that it is currently the background noise signal, it is judged that the current frame is not a noise signal when judging that any of the following conditions is met:

condition 1: the time-domain stability feature lt_stable_rate0 is greater than a time-domain stability threshold which is set;

condition 2: the smoothing filtered value of the first range spectral centroid feature is greater than a spectral centroid threshold which is set, and the time-domain stability feature is greater than the time-domain stability threshold which is set;

condition 3: the tonality feature or its smoothing filtered value is greater than a set tonality feature threshold, and the value of the time-domain stability feature lt_stable_rate0 is greater than its preset time-domain stability threshold;

condition 4: the spectral flatness features of various sub-bands or the respective smoothing filtered values are less than their corresponding spectral flatness thresholds which are set;

condition 5: it is judged that the value of the frame energy parameter $E_{t1}$ is greater than the set frame energy threshold E_thr1.

The embodiment of the present document uses a background noise flag background_flag to indicate whether the current frame is a background noise or not, and agrees to set the background noise flag background_flag to 1 if the current frame is judged to be the background noise, otherwise the background noise flag background_flag is set to 0.

It is to detect whether the current frame is a noise signal or not according to the time-domain stability features, the spectral centroid features, the spectral flatness features, the tonality features, and the current frame energy parameter. If it is not a noise signal, the background noise flag background_flag will be set to 0.

The process is as follows:

for condition 1: it is to judge whether the time-domain stability feature lt_stable_rate0 is greater than a first time-domain stability threshold which is set. If yes, the current frame is judged not to be the noise signal, and the background_flag is set to 0. In the embodiment of the present document, the value range of the first time-domain stability threshold is [0.8, 1.6];

for condition 2: it is to judge whether the first range smoothing spectral centroid feature is greater than a first spectral centroid threshold sp_center_thr1 which is set, and the value of the time-domain stability features lt_stable_rate0 is also greater than the second time-domain stability threshold lt_stable_rate_thr2. If yes, the current frame is judged not to be a noise signal, and the background_flag is set to 0. The value range of sp_center_thr1 is [1.6, 4]; the value range of lt_stable_rate_thr2 is (0, 0.1].

For condition 3: it is to judge whether the value of the tonality features tonality_rate2 is greater than the first tonality feature threshold tonality_rate_thr1 or not, and whether the value of the time-domain stability features lt_stable_rate0 is greater than the third preset time-domain stability threshold lt_stable_rate_thr3 or not, if both of the above conditions are met, it is judged that the current frame is not a background noise, and the background_flag is assigned as 0. The value range of tonality_rate_thr1 is [0.4, 0.66]. The value range of lt_stable_rate_thr3 is [0.06, 0.3].

For condition 4: it is to judge whether the value of the first spectral flatness feature sSMR[0] is less than the first spectral flatness threshold sSMR_thr1 which is set, whether the value of the second spectral flatness feature sSMR[1] is less than the second spectral flatness threshold sSMR_thr2 which is set, and whether the value of the third spectral flatness feature sSMR[2] is less than the third spectral flatness threshold sSMR_thr3 which is set. If all of the abovementioned conditions are met, it is judged that the current frame is not a background noise. The background_flag is assigned as 0. The value ranges of the thresholds sSMR_thr1, sSMR_thr2, sSMR_thr3 are [0.88, 0.98]. It is to judge whether the value of the first spectral flatness feature sSMR[0] is less than the fourth spectral flatness threshold sSMR_thr4 which is set, the value of the second spectral flatness feature sSMR[1] is less than the fifth spectral flatness threshold sSMR_thr5 which is set, the value of the third spectral flatness feature sSMR[2] is less than the sixth spectral flatness threshold sSMR_thr6 which is set. If anyone of the abovementioned conditions is met, it is judged that the current frame is not a background noise. The background_flag is assigned as 0. The value ranges of the thresholds sSMR_thr4, sSMR_thr5, sSMR_thr6 are [0.80, 0.92].

For condition 5: it is to judge whether the value of the frame energy parameter $E_{t1}$ is greater than the preset frame energy threshold E_thr1 or not, if the abovementioned condition is met, it is judged that the current frame is not a background noise. The background_flag is assigned as 0. The value of E_thr1 is in the dynamic range of the frame energy parameter.

In step 204: it is to calculate the tonal signal flag according to the tonality features, the spectral centroid features, the time-domain stability features, and the spectral flatness features; the steps can refer to the tonal signal calculation process in the third embodiment of the present document.

In step 205: it is to calculate the background noise energy of the current frame according to the frame energy parameter, the background noise flag, and the tonal signal flag. The steps are as follows:

1, if the background noise flag of the current frame is 1, it is to update the background noise energy accumulated value $E_{t\_sum}$ and the number of background noise energy accumulated frames $N_{Et\_counter}$, and the calculation equation is as follows:

$$E_{t\_sum} = E_{t\_sum\_-1} + E_{t1};$$

$$N_{Et\_counter} = N_{Et\_counter\_-1} + 1;$$

Wherein $E_{t\_sum\_-1}$ is the background noise energy accumulated value of the previous frame, $N_{Et\_counter\_-1}$ is the number of background noise energy accumulated frames calculated for the previous frame.

2, the energy of background noise over all sub-bands is the ratio of the background noise energy accumulated value $E_{t\_sum}$ to the number of accumulated frames $N_{Et\_counter}$:

$$E_{t\_bg} = \frac{E_{t\_sum}}{N_{Et\_counter}}$$

it is to judge whether $N_{Et\_counter}$ is equal to 64 or not, and if $N_{Et\_counter}$ is equal to 64, the background noise energy accumulated value $E_{t\_sum}$ and the number of accumulated frames $N_{Et\_counter}$ are respectively multiplied by 0.75.

3, it is to adjust the background noise energy accumulated value according to the values of tonal signal flag, the frame energy parameter, and the energy of background noise over all sub-bands. The calculation process is as follows:

if the tonal signal flag tonality_flag is equal to 1 and the value of the frame energy parameter $E_{t1}$ is less than the value of the background noise energy parameter $E_{t\_bg}$ multiplied by a gain factor gain, then, $$E_{t\_sum} = E_{t\_sum} \cdot gain + delta;$$

wherein, the value range of gain is [0.3, 1].

In the following, the third embodiment of the present document will be described.

The embodiment of the present document provides a voice activity detection method that can be combined with the technical solutions provided in the first embodiment and the second embodiment of the present document to calculate the tonal signal flag, comprising:

judging whether the current frame is a tonal signal or not according to the tonality features, the time-domain stability features, the spectral flatness features, and the spectral centroid features.

When judging whether it is a tonal signal or not, it is to execute the following operations:

1, it is to use a tonal frame flag tonality_frame to indicate whether the current frame is a tonal frame or not;

when the value of tonality_frame is 1 in the embodiment of the present document, it indicates that the current frame is a tonal frame, and when it is 0, it indicates that the current frame is a non-tonal frame;

2. it is to judge whether the tonality feature tonality_rate1 or its smoothing filtered tonality_rate2 is greater than the corresponding first tonality feature decision threshold tonality_decision_thr1 which is set or the corresponding second tonality feature decision threshold tonality_decision_thr2, if any one of the abovementioned conditions is met, proceed to step 3, otherwise proceed to step 4;

wherein, the value range of tonality_decision_thr1 is [0.5, 0.7], and the value range of tonality_decision_thr2 is [0.7, 0.99].

3, if the time-domain stability feature lt_stable_rate0 is less than the preset first time-domain stability decision threshold lt_stable_decision_thr1; the value of the spectral centroid feature sp_center[1] is greater than the value of the preset first spectral centroid decision threshold spc_decision_thr1, and any one of spectral flatness features of sub-bands is less than its corresponding preset spectral flatness threshold, that is, the first spectral flatness feature sSMR[0] is less than a preset first spectral flatness decision threshold sSMF_decision_thr1, or the second spectral flatness feature sSMR[1] is less than a preset second spectral flatness decision threshold sSMF_decision_thr2, or the third spectral flatness feature sSMR[2] is less than a preset third spectral flatness decision threshold sSMF_decision_thr3; then it is to determine that the current frame is a tonal frame, and set the tonal frame flag tonality_frame to 1, otherwise, it is to determine that the current frame is a non-tonal frame, and set the value of tonal frame flag tonality_frame to 0. It is to proceed to step 4.

Wherein, the value range of lt_stable_decision_thr1 is [0.01,0.25], spc_decision_thr1 is [1.0,1.8], sSMF_decision_thr1 is [0.6, 0.9], sSMF_decision_thr2 is [0.6, 0.9], and sSMF_decision_thr3 is [0.7, 0.98].

4, it is to update the tonality degree feature tonality_degree according to the tonal frame flag tonality_frame, wherein the initial value of the tonality degree feature tonality_degree is set when the voice activity detection device starts to work, and its value range is [0,1]. Under different circumstances, the tonality degree feature calculation method is different:

if the current tonal frame flag indicates that the current frame is a tonal frame, the following expression is used to update the tonality degree feature tonality_degree.

$$tonality\_degree = tonality\_degree_{-1} \cdot td\_scale\_A + td\_scale\_B;$$

wherein, $tonality\_degree_{-1}$ is the tonality degree feature of the previous frame. Its initial value is in the value range of [0, 1]. td_scale_A is the attenuation coefficient, and its value range is [0, 1]; td_scale_B is the accumulation coefficient, and its value range is [0, 1].

5, it is to judge whether the current frame is a tonal signal or not according to the updated tonality degree feature tonality_degree, and set the value of the tonal signal flag tonality_flag;

if the tonality degree feature tonality_degree is greater than the preset tonality degree threshold, it is determined that the current frame is a tonal signal, otherwise, it is determined that the current frame is a non-tonal signal.

In the following, in conjunction with the accompanying drawings, the fourth embodiment of the present document will be described.

Figure 3:
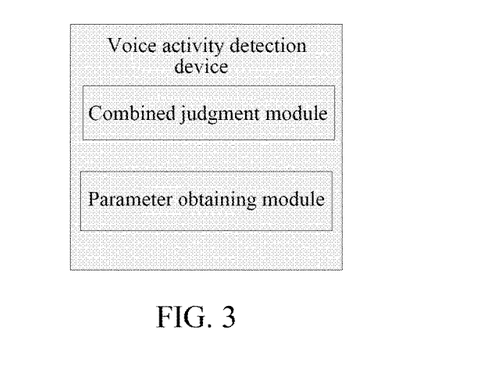
FIG. 3 is a schematic diagram of the structure of a voice activity detection device provided in a fourth embodiment of the present document.

The embodiment of the present document further provides a voice activity detection device, and as shown in FIG. 3, the device comprises:

combined judgment module 301, configured to obtain a combined VAD judgment result according to the number of continuous active frames, the average total SNR of all sub-bands, the tonal signal flag and at least two existing VAD judgment results.

Figure 4:
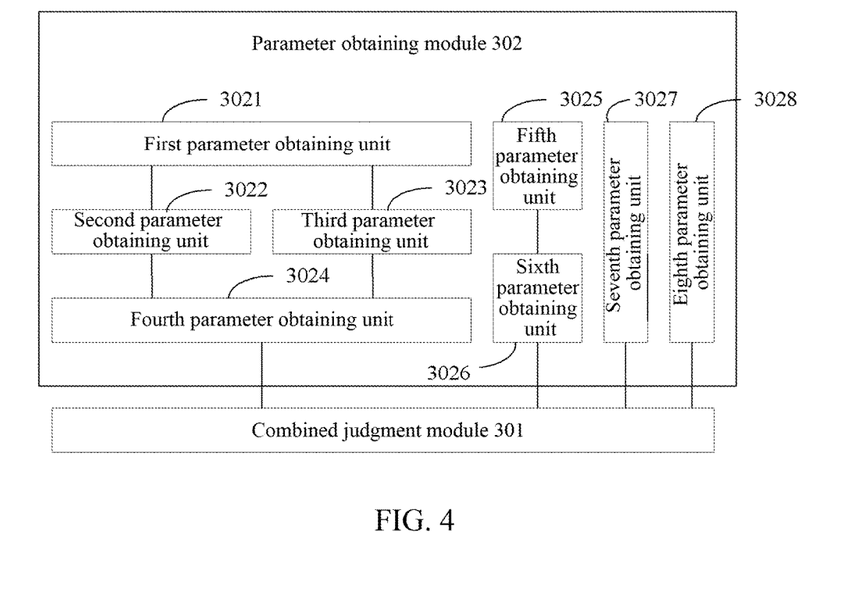
FIG. 4 is a schematic diagram of the structure of parameter obtaining module 302 in FIG. 3.

Preferably, the device further comprises a parameter obtaining module 302, and the structure of the parameter obtaining module 302 is shown in FIG. 4, comprising:

a first parameter obtaining unit 3021, configured to obtain the sub-band signal and the spectrum amplitude of the current frame;

a second parameter obtaining unit 3022, configured to calculate the frame energy parameter, the spectral centroid features, and the time-domain stability features of the current frame according to the sub-band signal;

a third parameter obtaining unit 3023, configured to calculate the spectral flatness features and the tonality features according to the spectrum amplitude; and the calculation method can refer to the third embodiment of the.

a fourth parameter obtaining unit 3024, configured to calculate the tonal signal flag according to the tonality features, the spectral centroid features, the time-domain stability features and the spectral flatness features.

Preferably, the parameter obtaining module 302 further comprises:

a fifth parameter obtaining unit 3025, configured to obtain the background noise energy estimated from the previous frame; the calculation method may refer to the second embodiment of the present document.

a sixth parameter obtaining unit 3026, configured to calculate the average total SNR of all sub-bands according to the background noise energy estimated from the previous frame and the frame energy parameter of the current frame.

Preferably, the parameter obtaining module 302 further comprises:

a seventh parameter obtaining unit 3027, configured to determine that the number of continuous active frames is 0 when the current frame is the first frame, calculating the current number of continuous active frames continuous_speech_num2 through the previous combined VAD judgment result when the current frame is a second frame and subsequent frames: when the combined VAD flag vad_flag is 1, the continuous_speech_num2 is added by 1;

when the vad_flag is judged to be 0, the continuous_speech_num2 is set to 0.

Preferably, the parameter obtaining module 302 further comprises:

an eighth parameter obtaining unit 3028, configured to obtain the at least two existing VAD judgment results.

The embodiment of the present document provides a voice activity detection method and device to obtain a combined VAD judgment result according to the number of continuous active frames, the average total SNR of all sub-bands, the tonal signal flag and the at least two VAD judgment results, to achieve a comprehensive VAD judgment according to various parameters, improve the accuracy of a VAD decision, and solve the problem of inaccurate VAD detection.

Those ordinarily skilled in the art can understand that all or some of the steps of the abovementioned embodiments may be implemented by using a computer program process, and the computer program may be stored in a computer-readable storage medium and executed on an appropriate hardware platform (such as a system, equipment, device, apparatus and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art within the scope of the present document discloses a technique can easily think of changes or replacements that shall fall within the protection scope disclosed in the present document. Therefore, the protection scope of the present document should be the protection scope of the claims.

INDUSTRIAL APPLICABILITY

The embodiment of the present document provides a voice activity detection method and device to obtain a combined VAD judgment result according to the number of continuous active frames, the average total SNR of all sub-bands, the tonal signal flag and the at least two VAD judgment results, to achieve a VAD judgment comprehensively according to various parameters, improve the accuracy of a VAD decision, and solve the problem of inaccurate VAD detection.

What is claimed is:

1. A voice activity detection method, comprising:
obtaining a combined voice activity detection, VAD, judgment result according to the number of continuous active frames, an average total signal to noise ratio, SNR, of all sub-bands, a tonal signal flag and at least two existing VAD judgment results; wherein, the method further comprises:
obtaining a sub-band signal of a current frame;
calculating frame energy parameters according to the sub-band signal;
obtaining background noise energy estimated from a previous frame;
calculating the average total SNR of all sub-bands according to the background noise energy estimated from the previous frame and frame energy parameters of a current frame; wherein, said obtaining the background noise energy estimated from the previous frame comprises:
obtaining a sub-band signal and a spectrum amplitude of the previous frame;
calculating frame energy parameters, spectral centroid features and time-domain stability features of the previous frame according to the sub-band signal of the previous frame;
calculating spectral flatness features and tonality features of the previous frame according to the spectrum amplitude of the previous frame;
calculating a background noise flag of the previous frame according to the frame energy parameters, the spectral centroid features, the time-domain stability features, the spectral flatness features and the tonality features of the previous frame;
calculating a tonal signal flag of the previous frame according to the tonality features, the spectral centroid features, the time-domain stability features and the spectral flatness parameter of the previous frame;
obtaining the energy of background noise over all sub-bands of the previous frame according to the background noise flag, the frame energy parameters and the tonal signal flag of the previous frame and the energy of background noise over all sub-bands of a frame before previous frame.

2. The voice activity detection method of claim 1, wherein,
the frame energy parameters are the weighted or non-weighted sum of energies of all sub-bands;
the spectral centroid features are the ratio of the weighted sum to the non-weighted sum of signal energies of all sub-bands or partial sub-bands, or a value is obtained by applying a smooth filter to the ratio of the weighted sum to the non-weighted sum of signal energies of all sub-bands or partial sub-bands;

the time-domain stability features are the ratio of variance of a plurality of sums of energy amplitudes of two adjacent frames to the expectation of square of a plurality of sums of energy amplitudes of two adjacent frames, or the ratio of variance of a plurality of sums of energy amplitudes of two adjacent frames to the expectation of square of a plurality of sums of energy amplitudes of two adjacent frames multiplied by a factor;

the spectral flatness features are the ratio of the geometric mean to the arithmetic mean of certain spectrum amplitude, or the ratio of the geometric mean to the arithmetic mean of certain spectrum amplitude multiplied by a factor;

the tonality features are obtained by calculating a correlation coefficient of intra-frame spectral difference coefficient of two adjacent frame signals, or obtained by continuously smoothing filtering the correlation coefficient.

3. The voice activity detection method of claim 1, wherein calculating the tonal signal flag according to the tonality features, the spectral centroid features, the time-domain stability features, and the spectral flatness features comprises:

A) when a current frame signal is a non-tonal signal, using one tonal frame flag tonality_frame to indicate whether the current frame is a tonal frame or not;

B) executing step C) when one of the following conditions is met, and executing step D) when neither of the following two conditions is met:

condition 1: the value of the tonality features tonality_rate1 is greater than a corresponding first tonality feature decision threshold which is set;

condition 2: the value of smoothing filtered value of tonality_rate2 is greater than a corresponding second tonality feature threshold which is set;

C) judging whether the current frame is a tonal frame or not, and setting the value of the tonal frame flag according to a judgment result:

determining that the current frame is a tonal frame when all of the following conditions are met, and determining that the current frame is a non-tonal frame and executing step D) when any one or more of the following conditions are not met:

condition 1: the value of the time-domain stability feature is less than a first time-domain stability decision threshold which is set;

condition 2: the value of the spectral centroid feature is greater than a first spectral centroid decision threshold which is set;

condition 3: when any one of the spectral flatness features of sub-bands is less than its corresponding preset spectral flatness decision threshold;

D) updating a tonality degree feature tonality_degree according to the tonal frame flag, wherein an initial value of the tonality degree feature tonality_degree is set when a voice activity detection starts to work;

E) judging whether the current frame is a tonal signal or not according to the updated tonality degree feature tonality_degree, and setting the value of a tonal signal flag tonality_flag.

4. The voice activity detection method of claim 3, wherein when the current tonal frame flag indicates that the current frame is a tonal frame, a following expression is used to update the tonality degree feature tonality_degree:

$$\text{tonality\_degree} = \text{tonality\_degree}_{-1} \cdot td\_scale\_A + td\_scale\_B,$$

wherein, tonality_degree$_{-1}$ is a tonality degree feature of a previous frame, whose initial value is in the value range of [0,1], td_scale_A is an attenuation coefficient and td_scale_B is an accumulation coefficient.

5. The voice activity detection method of claim 3, wherein, when the tonality degree feature tonality_degree is greater than a preset tonality degree threshold, the current frame is determined to be a tonal signal;

when the tonality degree feature tonality_degree is less than or equal to a preset tonality degree threshold, that the current frame is determined to be a non-tonal signal.

6. The voice activity detection method of claim 1, wherein, the method further comprises:

when a current frame is a second frame and subsequent frames, calculating the current number of continuous active frames continuous_speech_num2 through a previous combined VAD judgment result:

when a combined VAD flag vad_flag is 1, the continuous_speech_num2 is added by 1;

when the combined VAD flag vad_flag is determined to be 0, the continuous_speech_num2 is set to 0.

7. The voice activity detection method of claim 6, wherein, the method further comprises:

when the current frame is a first frame, the number of continuous active frames is 0.

8. The voice activity detection method of claim 1, wherein, said obtaining a combined VAD judgment result according to the number of continuous active frames, the average total SNR of all sub-bands, the tonal signal flag and the at least two existing VAD judgment results comprises:

selecting a logical operation of the at least two existing VAD judgment results as a combined VAD judgment result when any one of the following conditions is met, selecting one of the at least two existing VAD judgment results as the combined VAD judgment result when at least one of the following conditions is not met, wherein the logical operation refers to a "or" operation or "and" operation:

condition 1: the average total SNR of all sub-bands is greater than a signal-to-noise ratio threshold, condition 2: the number of continuous active frames is greater than a threshold of the number of continuous active frames and the average total SNR of all sub-bands is greater than a signal-to-noise ratio threshold, condition 3: the tonal signal flag is set to 1.

9. The voice activity detection method of claim 1, wherein, said obtaining a combined VAD judgment result according to the number of continuous active frames, the average total SNR of all sub-bands, the tonal signal flag and the at least two existing VAD judgment results comprises:

the combined VAD judgment result being 1 when any one of the following conditions is met, and selecting a logical operation of the at least two existing VAD judgment results as an output of the combined VAD when at least one of the following conditions is not met, wherein the logical operation refers to an "or" operation or "and" operation:

condition 1: the at least two existing VAD judgment results are 1 condition 2: the sum of the at least two existing VAD judgment results is greater than a combined decision threshold, and the tonal signal flag is set to 1, condition 3: when the number of continuous active frames is greater than a threshold of the number of continuous active frames and the average total SNR of all sub-bands is greater than a signal-to-noise ratio threshold, and the tonal signal flag is set to 1.

10. A voice activity detection device, comprising hardware performing instructions stored in a non-transitory computer readable medium which executes steps in following module:

a combined judgment module, configured to obtain a combined voice activity detection, VAD, judgment result according to the number of continuous active frames, an average total signal to noise ratio, SNR, of all sub-bands, a tonal signal flag and at least two existing VAD judgment results; wherein the parameter obtaining module further comprises hardware performing instructions stored in a non-transitory computer readable medium which executes steps in following units:

a first parameter obtaining unit, configured to obtain a sub-band signal of a current frame;

a second parameter obtaining unit, configured to calculate frame energy parameters according to the sub-band signal;

a fifth parameter obtaining unit, configured to obtain a background noise energy estimated from a previous frame;

a sixth parameter obtaining unit, configured to calculate the average total SNR of all sub-bands according to the background noise energy estimated from the previous frame and the frame energy parameter of the current frame;

wherein, the fifth parameter obtaining unit further comprises a non-transitory computer readable medium storing instructions that when executed by a computer, cause the computer to implement the following steps:

obtaining a sub-band signal and a spectrum amplitude of the previous frame;

calculating frame energy parameters, spectral centroid features and time-domain stability features of the previous frame according to the sub-band signal of the previous frame;

calculating spectral flatness features and tonality features of the previous frame according to the spectrum amplitude of the previous frame;

calculating a background noise flag of the previous frame according to the frame energy parameters, the spectral centroid features, the time-domain stability features, the spectral flatness features and the tonality features of the previous frame;

calculating a tonal signal flag of the previous frame according to the tonality features, the spectral centroid features, the time-domain stability features and the spectral flatness parameter of the previous frame;

obtaining the energy of background noise over all sub-bands of the previous frame according to the background noise flag, the frame energy parameters and the tonal signal flag of the previous frame and the energy of background noise over all sub-bands of a frame before previous frame.

11. The voice activity detection device of claim 10, wherein the parameter obtaining module further comprises hardware performing instructions stored in a non-transitory computer readable medium which executes steps in following units:

a seventh parameter obtaining unit, configured to determine that the number of continuous active frames is 0 when the current frame is a first frame, calculate the current number of continuous active frames continuous_speech_num2 through a previous combined VAD judgment result when the current frame is a second frame and subsequent frames:

when a combined VAD flag vad_flag is 1, the continuous_speech_num2 is added by 1;

when the combined VAD flag vad_flag is determined to be 0, the continuous_speech_num2 is set to 0.

* * * * *